United States Patent Office 3,159,655
Patented Dec. 1, 1964

3,159,655
1,1-DIHALO-2-OXIRANE DERIVATIVES OF CYCLOPROPANE
William F. Tousignant, Midland, Mich., assignor to The Dow Chemical Company, Midland, Mich., a corporation of Delaware
No Drawing. Filed June 30, 1961, Ser. No. 120,952
4 Claims. (Cl. 260—348)

This invention is directed to the 1,1-dihalo-2-oxirane derivatives of cyclopropane corresponding to the formula

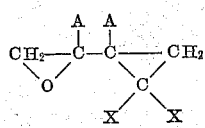

In this and succeeding formulas, the A symbol represents a hydrogen or lower alkyl and X represents a halogen, preferably chlorine or bromine. The expression "lower alkyl" refers to an alkyl radical containing from 1 to 4 carbon atoms, inclusive.

The compounds of this invention are liquids which are soluble in many organic solvents and insoluble in water. These epoxy compounds are adapted to be employed as additives to active hydrogen materials, to render the latter flame resistant or self-extinguishing when exposed to the usual conditions favoring combustion.

The compounds of this invention may be prepared by causing peroxytrifluoroacetic acid to react with a 1,1-dihalo-2-vinyl derivative of cyclopropane corresponding to the formula

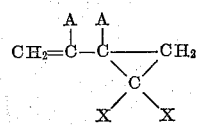

The peroxytrifluoroacetic acid may be prepared by the procedure given by E. D. Emmons and G. B. Lucas (JACS 77, 2287 (1955)). While other peroxy acids, such as peracetic and perbenzoic, may be employed, their use is accompanied by certain disadvantages as described by Emmons and Lucas. The dihalo-vinylcyclopropane may be prepared by the procedure given by R. C. Woodworth and P. S. Skell (JACS 79, 2542 (1957)). The reaction is carried out in an inert liquid medium containing a mildly alkaline or buffer agent such as dibasic sodium phosphate. An amount of this reagent adequate to neutralize the trifluoroacetic acid formed is necessary in order to prevent acid attack of the epoxy linkage of the product compound. The reacting-inducing contact between the 1,1-dihalo-2-vinyl derivative of cyclopropane and peroxytrifluoroacetic acid is accomplished by the gradual addition of the acid to the buffered solvent solution of the dihalo-vinylcyclopropane derivative with stirring and cooling of the exothermic reaction. Good results are obtained by reacting approximately equal molecular proportions of the cyclopropane derivative and the peroxytrifluoro acid.

In carrying out the reaction, the peracid is slowly added with stirring to the cyclopropane derivative which is dissolved in the buffered solvent. The exothermic reaction is maintained at a low temperature by cooling and after completion of the addition of the peracid, the reaction mixture is post-reacted for an additional period of time. Upon completion of the reaction, the inorganic salts are removed by filtration and the solution of the desired product is washed with a solution containing a compound such as sodium carbonate in order to remove residual acidity. After drying, the solvent is removed by distillation and the epoxy product is purified by vacuum distillation.

The following examples illustrate the present invention but are not to be considered as limiting.

*Example 1.*—*1,1 - Dibromo - 2 - Methyl - 2 - (Epoxyethyl)Cyclopropane*

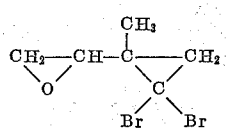

The peroxytrifluoroacetic acid was prepared by the dropwise addition of 25.4 cc. (0.13 mole) of trifluoroacetic anhydride to a solution of 4.1 cc. (0.15 mole) of 90 percent hydrogen peroxide in 50 cc. of methylene chloride. The addition was made in one hour at 0–5° C. The peracid solution was then added dropwise to a stirred mixture containing 200 cc. of methylene chloride, 65.0 grams (0.46 mole) of dibasic sodium phosphate and 24.0 grams (0.1 mole) of 1,1-dibromo-2-methyl-2-vinyl-cyclopropane. The addition was made in one hour with cooling necessary to maintain the exothermic reaction at 10–20° C. After completion of the peracid addition the mixture was post-reacted for an hour. The inorganic salts were then removed by filtration and washed with 100 cc. of methylene chloride. The combined methylene chloride solutions were washed with successive 100 cc. portions of 10 percent sodium carbonate to complete removal of residual acidity and dried overnight with anhydrous calcium sulfate. The calcium sulfate was removed by filtration and the methylene chloride removed by distillation. After purification by vacuum distillation the product was identified by infrared analysis as the desired epoxy derivative. The compound, 1,1-dibromo-2-methyl-2-(epoxyethyl)cyclopropane, had a boiling point of 112–113° C./18 mm. and $n_D^{25}$=1.5384.

*Example 2.*—*1,1-Dibromo-2-(Epoxyethyl)Cyclopropane*

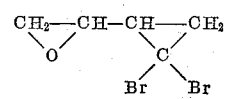

Peroxytrifluoroacetic acid, prepared by the method and in the quantity described in Example 1, was added dropwise with cooling and stirring to a reaction mixture consisting of 75 cc. of methylene chloride, 65.0 grams (0.46 mole) of dibasic sodium phosphate and 24.5 grams (0.1 mole) of 92 percent 1,1-dibromo-2-vinylcyclopropane. The principal impurity in this cyclopropane derivative was bromoform. The addition was made in one and a half hours at 11–18° C. After addition of the peracid the mixture was post-reacted for one hour and the inorganic salts removed and washed with methylene chloride. The methylene chloride solution, after being washed with a 10 percent aqueous sodium carbonate solution and water, was dried and the methylene chloride removed by distillation. Vacuum distillation of the product isolated a compound which infrared analysis identified as the desired epoxy derivative. This compound, 1,1-dibromo-2-(epoxyethyl)-cyclopropane has a boiling point of 75–76° C./5 mm. and a refractive index, $n_D^{25}$=1.4733.

*Example 3.*—*1,1 - Dichloro - 2 - (Epoxyethyl)Cyclopropane*

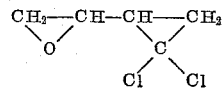

50.8 cc. (0.36 mole) of trifluoroacetic anhydride was added dropwise over a thirty minute period to a solution of 8.2 cc. (0.3 mole) of 90 percent hydrogen peroxide in 50 cc. of methylene chloride at 0° C. with stirring. The peracid solution was then added to a mixture of 130.0 grams (0.92 mole) of dibasic sodium phosphate and 150 cc. of methylene chloride containing 27.2 grams (0.2 mole) of 1,1,-dichloro-2-vinylcyclopropane. The addition was made over a period of one hour at 10–20° C. with cooling and stirring. Post-reaction was carried out for an additional hour and the product was isolated as in the previous examples. Infrared analysis identified the epoxidized product as the desired 1,1-dichloro-2-(epoxyethyl)cyclopropane. This compound boils at 94 to 100° C./50 mm. and has a refractive index of $n_D^{25}=1.4835$.

The compounds of this invention are useful as self-extinguishing additives to active hydrogen materials. For example, such materials as polyurethanes, polyglycols and cellulosics may be made flame retardant or self-extinguishing by reacting with an amount of the bromo epoxy compound sufficient to provide two to twenty percent by weight of bromine in the product material. This use of these compounds as self-extinguishing additives to active hydrogen materials is particularly advantageous from two standpoints. First, the high weight percentage of halogen in the relatively low molecular weight epoxy compound is very desirable and, second, the inclusion of a self-extinguishing additive through chemical combination rather than conventional physical incorporation avoids problems of loss of the additive through leaching or other means of physical deterioration of the material. Thus, combustible hydroxy compounds react to form self-extinguishing halogenated ethers. Letting ROH represent such a compound, the reaction is typified as follows:

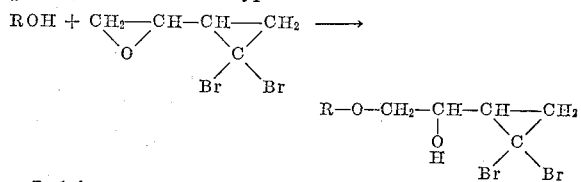

I claim:
1. A compound of the formula

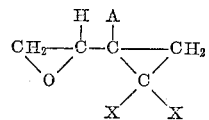

wherein the A symbol represents a member of the group consisting of hydrogen and lower alkyl and X represents a member of the group consisting of chlorine and bromine.
2. 1,1 - dibromo - 2 - methyl - 2 - (epoxyethyl)cyclopropane.
3. 1,1-dibromo-2-(epoxyethyl)cyclopropane.
4. 1,1-dichloro-2-(epoxyethyl)cyclopropane.

References Cited in the file of this patent
UNITED STATES PATENTS

| | | |
|---|---|---|
| 2,330,979 | Krantz et al. | Oct. 5, 1943 |
| 2,594,452 | Kosmin | Apr. 29, 1952 |
| 2,724,719 | Markley et al. | Nov. 22, 1955 |
| 3,041,291 | Bailey et al. | June 26, 1962 |

OTHER REFERENCES

Emmons et al.: J.A.C.S., vol. 77, January 5, 1955, pp. 89–92.